(12) United States Patent
Clare et al.

(10) Patent No.: US 8,867,242 B2
(45) Date of Patent: Oct. 21, 2014

(54) HYBRID 2-LEVEL AND MULTILEVEL HVDC CONVERTER

(75) Inventors: Jonathan Charles Clare, Nottinghamshire (GB); Matteo Tomasini, Altavilla Vicentina (IT); David Trainer, Derby (GB); Robert Whitehouse, Stafford (GB)

(73) Assignee: Alstom Technology Ltd, Baden (CH)

( * ) Notice: Subject to any disclaimer, the term of this patent is extended or adjusted under 35 U.S.C. 154(b) by 136 days.

(21) Appl. No.: 13/640,468

(22) PCT Filed: Apr. 15, 2010

(86) PCT No.: PCT/EP2010/054974
§ 371 (c)(1), (2), (4) Date: Dec. 20, 2012

(87) PCT Pub. No.: WO2011/127980
PCT Pub. Date: Oct. 20, 2011

(65) Prior Publication Data
US 2013/0128629 A1 May 23, 2013

(51) Int. Cl.
*H02J 3/36* (2006.01)
*H02M 5/45* (2006.01)
*H02M 1/15* (2006.01)
*H02M 1/12* (2006.01)
*H02M 7/797* (2006.01)
*H02M 7/483* (2007.01)
*H02J 3/01* (2006.01)

(52) U.S. Cl.
CPC .......... *H02J 3/36* (2013.01); *H02M 2007/4835* (2013.01); *H02M 1/15* (2013.01); *H02M 1/12* (2013.01); *Y02E 60/60* (2013.01); *H02J 3/01* (2013.01); *H02M 7/797* (2013.01)
USPC .............................................. 363/35; 363/37

(58) Field of Classification Search
CPC .......... H02M 7/06; H02M 1/12; H02M 7/21; H02M 7/217; H02M 7/2176; H02M 2001/12; H02M 2007/217

USPC .................. 363/35–39, 44, 65–68, 125–132; 323/205–208, 266
See application file for complete search history.

(56) References Cited

U.S. PATENT DOCUMENTS 3,867,643 A 2/1975 Baker et al.
4,053,820 A * 10/1977 Peterson et al. ................ 363/44

(Continued)

FOREIGN PATENT DOCUMENTS

DE 195 35 552 4/1996
DE 101 03 031 7/2002

(Continued)

OTHER PUBLICATIONS

Allebrod, S. et al., "New Transformerless, Scalable Modular Multilevel Converters for HVDC—Transmission", Power Electronics Specialists Conference, IEEE, Jun. 15, 2008, pp. 174-179.

(Continued)

*Primary Examiner* — Timothy J Dole
*Assistant Examiner* — Yusef Ahmed
(74) *Attorney, Agent, or Firm* — Nixon Peabody LLP

(57) ABSTRACT

A voltage source converter is used in high voltage direct current power transmission and reactive power compensation. The voltage source converter includes first and second DC terminals for connection in use to a DC network, three phase elements and at least one auxiliary converter connected between the first and second DC terminals, each phase element including a plurality of primary switching elements and at least one AC terminal for connection in use to a respective phase of a multi-phase AC network, the plurality of primary switching elements being controllable in use to facilitate power conversion between the AC and DC networks, the or each auxiliary converter being operable in use to act as a waveform synthesizer to modify a first DC voltage presented to the DC network so as to minimize ripple in the DC voltage.

30 Claims, 6 Drawing Sheets

(56) References Cited

U.S. PATENT DOCUMENTS

| | | | |
|---|---|---|---|
| 4,663,702 A * | 5/1987 | Tanaka | 363/65 |
| 4,816,736 A * | 3/1989 | Dougherty et al. | 320/116 |
| 5,093,583 A * | 3/1992 | Mashino et al. | 307/10.1 |
| 5,345,375 A * | 9/1994 | Mohan | 363/40 |
| 5,499,178 A * | 3/1996 | Mohan | 363/39 |
| 5,515,264 A * | 5/1996 | Stacey | 363/132 |
| 5,532,575 A | 7/1996 | Ainsworth et al. | |
| 5,644,482 A | 7/1997 | Asplund | |
| 5,673,189 A | 9/1997 | Schettler | |
| 5,719,486 A * | 2/1998 | Taniguchi et al. | 322/28 |
| 5,726,557 A * | 3/1998 | Umeda et al. | 322/21 |
| 5,889,667 A * | 3/1999 | Bernet | 363/127 |
| 5,892,677 A * | 4/1999 | Chang | 363/152 |
| 5,936,855 A | 8/1999 | Salmon | |
| 5,999,422 A | 12/1999 | Goransson et al. | |
| 6,134,126 A * | 10/2000 | Ikekame et al. | 363/39 |
| 6,236,580 B1 * | 5/2001 | Aiello et al. | 363/37 |
| 6,301,130 B1 * | 10/2001 | Aiello et al. | 363/37 |
| 6,320,767 B1 * | 11/2001 | Shimoura et al. | 363/37 |
| 6,392,348 B1 * | 5/2002 | Dougherty | 315/82 |
| 6,879,062 B2 | 4/2005 | Oates | |
| 6,987,680 B2 | 1/2006 | Vire et al. | |
| 7,170,767 B2 | 1/2007 | Bixel | |
| 7,274,576 B1 | 9/2007 | Zargari et al. | |
| 7,292,462 B2 | 11/2007 | Watanabe et al. | |
| 7,298,115 B2 * | 11/2007 | Nishimura et al. | 322/28 |
| 7,499,291 B2 | 3/2009 | Han | |
| 7,622,825 B2 | 11/2009 | Brune et al. | |
| 8,188,720 B2 | 5/2012 | Kim et al. | |
| 8,390,259 B2 | 3/2013 | Dommaschk et al. | |
| 8,599,591 B2 | 12/2013 | Crookes et al. | |
| 2003/0202367 A1 * | 10/2003 | Schreiber | 363/72 |
| 2004/0218318 A1 | 11/2004 | Bijlenga et al. | |
| 2005/0127853 A1 | 6/2005 | Su | |
| 2005/0135126 A1 * | 6/2005 | Gazel et al. | 363/67 |
| 2005/0146226 A1 * | 7/2005 | Trainer et al. | 307/73 |
| 2008/0002443 A1 | 1/2008 | Ueda et al. | |
| 2008/0007978 A1 * | 1/2008 | Han | 363/35 |
| 2008/0179951 A1 | 7/2008 | Brune et al. | |
| 2008/0205093 A1 | 8/2008 | Davies et al. | |
| 2008/0310205 A1 | 12/2008 | Hiller | |
| 2009/0027934 A1 * | 1/2009 | Robledo Bustos | 363/126 |
| 2009/0085548 A1 | 4/2009 | Suh et al. | |
| 2009/0102436 A1 * | 4/2009 | Escobar Valderrama et al. | 323/207 |
| 2009/0206781 A1 | 8/2009 | Itoh et al. | |
| 2010/0067266 A1 * | 3/2010 | Dommaschk et al. | 363/64 |
| 2010/0118578 A1 | 5/2010 | Dommaschk et al. | |
| 2010/0309698 A1 | 12/2010 | Asplund et al. | |
| 2011/0018481 A1 * | 1/2011 | Hiller | 318/400.26 |
| 2011/0205768 A1 | 8/2011 | Svensson | |
| 2011/0260701 A1 | 10/2011 | Horger et al. | |
| 2012/0026767 A1 | 2/2012 | Inoue et al. | |
| 2012/0069610 A1 * | 3/2012 | Trainer et al. | 363/35 |
| 2012/0113699 A1 * | 5/2012 | Crookes et al. | 363/126 |
| 2012/0120697 A1 | 5/2012 | Cuk | |
| 2012/0127766 A1 * | 5/2012 | Crookes et al. | 363/126 |
| 2012/0170338 A1 * | 7/2012 | Trainer et al. | 363/127 |
| 2012/0182771 A1 * | 7/2012 | Trainer et al. | 363/51 |
| 2012/0188803 A1 * | 7/2012 | Trainer et al. | 363/37 |
| 2013/0026841 A1 | 1/2013 | Hosini et al. | |
| 2013/0051105 A1 | 2/2013 | Wang et al. | |
| 2013/0094264 A1 | 4/2013 | Crookes et al. | |
| 2013/0119970 A1 | 5/2013 | Trainer et al. | |
| 2013/0128629 A1 * | 5/2013 | Clare et al. | 363/35 |
| 2013/0128636 A1 * | 5/2013 | Trainer et al. | 363/65 |
| 2013/0182467 A1 * | 7/2013 | Cross et al. | 363/35 |
| 2013/0194838 A1 | 8/2013 | Jang et al. | |
| 2013/0208514 A1 * | 8/2013 | Trainer et al. | 363/35 |
| 2013/0208521 A1 | 8/2013 | Trainer et al. | |
| 2013/0279211 A1 * | 10/2013 | Green et al. | 363/35 |
| 2014/0098575 A1 | 4/2014 | Whitehouse | |
| 2014/0146583 A1 | 5/2014 | Trainer et al. | |

FOREIGN PATENT DOCUMENTS

| | | |
|---|---|---|
| EP | 1 800 391 | 6/2007 |
| GB | 2 294 821 | 5/1996 |
| GB | 2 418 079 | 3/2006 |
| WO | 97/02639 | 1/1997 |
| WO | 02/063758 | 8/2002 |
| WO | 03/055048 | 7/2003 |
| WO | 2007/028349 | 3/2007 |
| WO | 2007/028350 | 3/2007 |
| WO | 2008/086760 | 7/2008 |
| WO | 2009/149743 | 12/2009 |
| WO | 2010/025758 | 3/2010 |
| WO | 2010/069371 | 6/2010 |
| WO | 2010/088969 | 8/2010 |
| WO | 2010/145688 | 12/2010 |
| WO | 2010/145689 | 12/2010 |
| WO | 2010/145690 | 12/2010 |
| WO | 2010/149200 | 12/2010 |
| WO | 2011/012171 | 2/2011 |
| WO | 2011/012174 | 2/2011 |
| WO | 2011/050847 | 5/2011 |
| WO | 2011/098117 | 8/2011 |
| WO | 2011/113471 | 9/2011 |
| WO | 2011/124258 | 10/2011 |
| WO | 2011/157300 | 12/2011 |
| WO | 2012/013248 | 2/2012 |
| WO | 2012/167826 | 12/2012 |
| WO | 2013/000510 | 1/2013 |

OTHER PUBLICATIONS

Baran M. E. et al., "Overcurrent Protection in DC Zonal Shipboard Power Systems uisng Solid State Protection Devices", Electric Ship Technologies Symposium, 2007. ESTS '07. IEEE, IEEE, PI, May 1, 2007, pp. 221-224.

Glinka M., "Prototype of Multiphase Modular-Multilevel-Converter with 2MW Power Rating and 17-Level-Output-Voltage", 2004 35th Annual IEEE Power Electronics Specialists Conference, Jun. 20-25, 2004, pp. 2572-2576.

Guanjun Ding et al., "New Technologies of Voltage Source Converter (VSC) for HVDC Transmission System Based on VSC", Power and Energy Society General Meeting—Conversion and Delivery of Electrical Energy in the 21st Century, 2008 IEEE, IEEE, Piscataway, NJ, USA, Jul. 20, 2008, p. 1-8.

Hagiwara, Makoto et al., "PWM Control and Experiment of Modular Multilevel Converters", Power Electronics Specialists Conference, PESC 2008, IEEE, Piscataway, NJ, USA, pp. 154-161, (2008).

Hongbo, Jiang, et al., "Harmonic Cancellation of a Hybrid Converter", High Power Electronics, The Royal Institute of Technology, Stockholm Sweden, IEEE Transactions on Power Delivery, vol. 13, No. 4, Oct. 1998, pp. 1291-1296.

Knudsen, L. et al., "Description and Prospective Applications of New Multi-Terminal HVDC System Concepts", CIGRE Conf. Internationale Des Grands Reseaux Electriques, Aug. 26-Sep. 1, 1990, pp. 1-11.

Lesnicar, A. et al., "A New Modular Voltage Source Inverter Topology", pp. 1-10, (2003), XP002454302.

Lesnicar, A. et al., "An Innovative Modular Multilevel Converter Topology Suitable for a Wide Power Range", 2003 IEEE Bologna PowerTech Conference, Jun. 23-26, 2003, pp. 1-6.

Liu, Y.H. et al., "A New STATCOM Configuration Using Multi-Level DC Voltage Reinjection for High Power Application", IEEE Transactions on Power Delivery, vol. 19, No. 4, Oct. 2004, New Zealand, pp. 1828-1834.

Liu, Y.H. et al., "A New High-Pulse Voltage-Sourced Converter for HVdc Transmission", IEEE Transactions on Power Delivery, vol. 18, No. 4, Oct. 2003, New Zealand, pp. 1388-1393.

Qahraman, B. et al., "A VSC Based Series Hybrid Converter for HVDC Transmission", IIEE 0-7803-8886-0/05 CCECE/CCGEI, Saskatoon, May 2005, pp. 458-461.

Raju, N. Ravisekhar, "A DC Link-Modulated Three-Phase Converter", Silicon Power Corp., IEEE, 0-7803-7116-X/01, 2001, pp. 2181-2185.

(56) References Cited

OTHER PUBLICATIONS

Su, Gui-Jia et al., "Multilevel DC Link Inverter for Brushless Permanent Magnet Motors with Very Low Inductance", Prepared by Oak Ridge National Laboratory for U.S. Dept. of Energy, 2001, IEEE 0-7803-7116-X/01, pp. 829-834.
Wong, C. et al., "Feasibility Study of AC and DC-Side Active Filters for HDVC Converter Terminals", IEEE Transactions on Power Delivery, vol. 4, No. 4, Oct. 1989, New York, NY, USA, pp. 2067-2075.
Zhang, W. et al., "Active DC Filter for HVDC Systems", IEEE Computer Applications in Power, vol. 7, No. 1, Jan. 1994, New York, USA, pp. 40-44.
PCT International Search Report and Written Opinion for Application No. PCT/EP2009/057388, mailed on Mar. 18, 2010.
PCT International Preliminary Report on Patentability in International Application No. PCT/EP2009/057388, mailed on Dec. 14, 2011.
PCT International Search Report and Written Opinion in International Application No. PCT/EP2009/057736, mailed on Mar. 26, 2010.
PCT International Preliminary Report on Patentability in International Application No. PCT/EP2009/057736, mailed on Nov. 24, 2011.
PCT International Search Report and Written Opinion in International Application No. PCT/EP2009/059973, mailed on Aug. 13, 2010.
PCT International Preliminary Report on Patentability in International Application No. PCT/EP2009/059973, mailed on Oct. 5, 2011.
PCT International Search Report and Written Opinion in International Application No. PCT/EP2010/051572, mailed on Jan. 19, 2011.
PCT International Preliminary Report on Patentability in International Application No. PCT/EP2010/051572, mailed on Apr. 20, 2012.
PCT International Search Report and Written Opinion in International Application No. PCT/EP2010/053290, mailed on Feb. 11, 2011.
PCT International Preliminary Report on Patentability in International Application No. PCT/EP2010/053290, mailed on Apr. 20, 2012.
PCT International Search Report and Written Opinion in International Application No. PCT/EP2010/054660, mailed on Feb. 24, 2011.
PCT International Preliminary Report on Patentability in International Application No. PCT/EP2010/054660, mailed on Jun. 6, 2012.
PCT International Search Report for International Application No. PCT/EP2010/054974, mailed on Mar. 4, 2011.
PCT International Preliminary Report on Patentability in International Application No. PCT/EP2010/054974, mailed on Aug. 10, 2012.
PCT International Search Report and Written Opinion in International Application No. PCT/EP2010/058630, mailed on Apr. 19, 2011.
PCT International Preliminary Report on Patentability in International Application No. PCT/EP2010/058630, mailed on Dec. 19, 2012.
PCT International Search Report and Written Opinion for Application No. PCT/EP2010/061145, mailed on Jun. 5, 2011.
PCT International Preliminary Report on Patentability in International Application No. PCT/EP2010/061145, mailed on Aug. 20, 2012.
PCT International Search Report and Written Opinion in International Application No. PCT/EP2011/059514, mailed on Jul. 5, 2012.
PCT International Preliminary Report on Patentability in International Application No. PCT/EP2011/059514, mailed on Aug. 1, 2013.
PCT International Search Report and Written Opinion in International Application No. PCT/EP2011/060907, mailed on Jul. 16, 2012.
PCT International Preliminary Report on Patentability in International Application No. PCT/EP2011/060907, mailed on Sep. 24, 2013.
Office Action in U.S. Appl. No. 13/388,277, mailed on Nov. 22, 2013.
Notice of Allowance in U.S. Appl. No. 13/378,336, mailed on Feb. 6, 2014.
Notice of Allowance in U.S. Appl. No. 13/380,500, mailed on Jun. 11, 2013.
Notice of Allowance in U.S. Appl. No. 13/380,500, mailed on Jul. 31, 2013.
Notice of Allowance in U.S. Appl. No. 13/576,920, mailed on Dec. 4, 2013.
Notice of Allowance in U.S. Appl. No. 13/576,920, mailed on Mar. 20, 2014.
U.S. Appl. No. 14/129,923, filed Dec. 27, 2013.
First Chinese Office Action in Application No. 200980160700.4, mailed Jun. 25, 2014.
Office Action in U.S. Appl. No. 13/388,277, mailed on Jul. 3, 2014.
Office Action in U.S. Appl. No. 13/639,844, mailed on May 22, 2014.
Notice of Allowance in U.S. Appl. No. 13/813,414, mailed on Jun. 2, 2014.
Notice of Allowance in U.S. Appl. No. 13/818,654, mailed on May 30, 2014.
Notice of Allowance in U.S. Appl. No. 13/378,336, mailed on Jun. 13, 2014.
Notice of Allowance in U.S. Appl. No. 13/576,920, mailed on Jun. 9, 2014.

\* cited by examiner

HYBRID 2-LEVEL AND MULTILEVEL HVDC CONVERTER

This invention relates to a voltage source converter for use in high voltage direct current (HVDC) power transmission and reactive power compensation, and a method of operating a voltage source converter.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies. In any such power transmission network, converters are required at each interface between AC and DC power to effect the required conversion, and one such form of converter is a voltage source converter (VSC).

AC power is typically transmitted in the form of one or more sinusoidal waveforms depending on the number of AC phases. The presence of sinusoidal AC waveforms on the AC side of the voltage source converter can however lead to high levels of DC voltage ripple in the DC side of the voltage source converter and the associated DC network.

The presence of DC ripple in the DC network prevents the use of low cost cables, which are generally intolerant of alternating voltage stress, and thereby increases installation costs of DC power transmission lines. In addition, the alternating nature of the DC ripple leads to undesirable interference between the DC power transmission lines and nearby telephone lines, which increases the complexity of designing the layout of DC power transmission lines.

Conventionally, power stations utilize DC filtering equipment such as passive inductive and capacitive elements on the DC side of the voltage source converter to minimise DC ripple. The use of parallel capacitance and series inductance in combination with the voltage source converter respectively leads to reduction of voltage and current ripple. The high voltage nature of power transmission however means that it is necessary to employ large passive inductive and capacitive elements, which adds to the size, weight and cost of the associated power station. This is particularly undesirable in locations with limited space envelopes such as off-shore wind farms.

According to a first aspect of the invention, there is provided a voltage source converter for use in high voltage direct current power transmission and reactive power compensation, the voltage source converter comprising first and second DC terminals for connection in use to a DC network, three phase elements and at least one auxiliary converter connected between the first and second DC terminals, each phase element including a plurality of primary switching elements and at least one AC terminal for connection in use to a respective phase of a multi-phase AC network, the plurality of primary switching elements being controllable in use to facilitate power conversion between the AC and DC networks, the or each auxiliary converter being operable in use to act as a waveform synthesizer to modify a first DC voltage presented to the DC network so as to minimise ripple in the DC voltage.

The provision of the auxiliary converter results in a voltage source converter with a flexible DC side active filter capable of synthesizing a range of waveforms having different shapes and sizes to minimise DC ripple, which may vary depending on the characteristics of the AC and DC networks.

The reduction of DC ripple in the DC network not only reduces installation costs by enabling the use of low cost cables which are normally intolerant of alternating voltage stress, but also simplifies planning issues associated with the DC network, such as location, by minimising undesirable interference with telephone lines situated near the DC network.

The reduction of DC ripple in this manner also eliminates the need for DC side filtering equipment in the form of passive inductive and capacitive elements. This removes the additional cost of installing and maintaining DC side filtering equipment, improves the reliability and efficiency of the associated power station by minimising the amount of converter hardware, and reduces hardware size and weight, which is desirable in locations with limited space envelopes such as offshore power stations.

Preferably each phase element includes two parallel-connected strings of series-connected primary switching elements, the mid-points between each string of series-connected primary switching elements defining AC terminals for connection in use to a respective phase of the AC network.

Such a voltage source converter arrangement may be utilised to facilitate power conversion between the AC and DC networks.

In other embodiments, the voltage source converter may include three auxiliary converters connected between the first and second DC terminals, wherein each auxiliary converter is connected in parallel with a respective one of the phase elements to define a single-phase converter limb, and the three single-phase converter limbs are connected in series on the DC side of the circuit to define a two-terminal DC network for three-phase power transmission.

In addition to being suitable for facilitating power conversion between the AC and DC networks, this voltage source converter arrangement also allows each auxiliary converter to be controlled so as to have direct influence on the phase connected to the AC terminal of the respective phase element and limited influence on the other two phases connected to the AC terminals of the other two phase elements.

In further embodiments, the or each auxiliary converter may be operable in use to act as a waveform synthesizer to modify a second DC voltage presented to the DC side of the respective phase element. In such embodiments, the or each auxiliary converter may be operable in use to synthesize a near-approximation of a rectified sinusoidal waveform for presentation to the DC side of the respective phase element.

The or each auxiliary converter may be used to shape the DC voltage for transfer to the AC side of the voltage source converter. Otherwise the constant DC side voltage would produce a square wave voltage on the AC side of the or each phase element, with significant harmonic components and hard switching of the semiconductor devices. The provision of one or more auxiliary converters however allows for the production of a more desirable AC waveform with less harmonic distortion, such as a sinusoidal waveform, and also enables soft-switching of the semiconductor devices at low levels of voltage and current.

In order to minimise DC ripple in the first DC voltage, the or each auxiliary converter may be operable in use to synthesize a waveform including at least one rectified, zero-phase sequence triplen harmonic component to cancel one or more harmonic ripple components in the first DC voltage.

When the first DC voltage includes undesirable ripple components of the first DC voltage in the form of harmonics of the AC supply frequency such as $6^{th}$, $12^{th}$ and $18^{th}$ harmonics, the addition of higher order zero-phase sequence, triple harmonic components to the synthesized waveform cancels out each harmonic ripple component and thereby minimises DC ripple in the first DC voltage. For example, inclusion of $9^{th}$ and $15^{th}$ harmonic zero-phase sequence components in the synthesized waveform respectively leads to the elimination of the $6^{th}$ and $12^{th}$ harmonic ripple components in the first DC voltage.

The zero-phase sequence nature of the harmonic components means that when a transformer is used to interconnect the voltage source converter and the AC network, the effects of the additional modulation is limited to the secondary side of the transformer connected to the voltage source converter and has no effect on the AC voltage and current at the primary side of the transformer connected to the AC network. As such, the introduction of zero-phase sequence triplen harmonic components to minimise DC ripple has little detrimental effect on the AC network.

In order to minimise DC ripple in the first DC voltage, the or each auxiliary converter may be operable in use to synthesize a waveform including a DC voltage component and at least one harmonic AC voltage component, each waveform operating at a phase difference of 120 electrical degrees to the other two waveforms.

The phase difference of 120 electrical degrees between the synthesized waveforms means that the summation of the three synthesized waveforms leads to the harmonic AC voltage components being cancelled out, and thereby leaves a ripple-free DC side voltage consisting of the DC voltage components.

Such waveforms are more straightforward to synthesize, which simplifies control of the or each auxiliary converter when synthesizing the waveform. Although the use of non zero-phase sequence harmonic AC voltage components may result in low levels of harmonic distortion at the AC network, the low levels of harmonic distortion may be acceptable in AC networks with less stringent power quality requirements.

In embodiments of the invention, the voltage source converter may further include at least one tertiary converter, the or each tertiary converter being operable in use to act as a waveform synthesizer to modify one or more second DC voltages, each second DC voltage being presented to the DC side of the respective phase element. In such embodiments, the or each tertiary converter may be operable in use to synthesize a near-approximation of an offset rectified sinusoidal waveform for presentation to the DC side of the respective phase element.

In embodiments employing the use of single-phase converter limbs, each single-phase converter limb may include at least one tertiary converter. At least one tertiary converter may be connected in series with the phase element in the respective single-phase converter limb.

In other embodiments employing the use of tertiary converters, the phase elements may be connected in a cascade arrangement to define a first limb, three auxiliary converters may be connected in a cascade arrangement to define a second limb, the first and second limbs being connected in parallel on the DC side of the circuit between the first and second DC terminals, and a tertiary converter may be connected between a respective one of the junctions between the phase elements and a respective one of the junctions between the auxiliary converters.

The provision of the or each tertiary converter allows the generation of a desired AC waveform shape at the AC side of each phase element irrespective of the waveform shapes synthesized by the or each auxiliary converter. For example, when the auxiliary converter is used to synthesize waveforms including non-zero-phase sequence AC components to modify the first DC voltage and thereby minimise DC ripple, the or each tertiary converter can be controlled to modify the synthesized waveform to form an offset rectified sinusoidal waveform for presentation to the DC side of the phase element. This therefore allows the voltage source converter to simultaneously minimise DC ripple and maintain high quality AC sinusoidal waveforms with minimal harmonic distortion.

Preferably the or each tertiary converter and/or the or each auxiliary converter include a chain-link converter. Such a chain-link converter may include a chain of modules connected in series, each module including at least one pair of secondary switching elements connected in parallel with an energy storage device, the secondary switching elements being controllable in use so that the chain of modules connected in series presents a stepped variable voltage source.

To define a 2-quadrant unipolar module that can provide zero or positive voltage and can conduct current in two directions, the or each module may include a pair of secondary switching elements connected in parallel with the energy storage device in a half-bridge arrangement.

To define a 4-quadrant bipolar module that can provide negative, zero or positive voltage and can conduct current in two directions, the or each module may include two pairs of secondary switching elements connected in parallel with the energy storage device in a full-bridge arrangement.

The structure of the chain-link converter allows the build-up of a combined voltage, which is higher than the voltage provided by an individual module, via the insertion of multiple modules, each providing a voltage, into the chain-link converter. By varying the value of the combined voltage, the chain-link converter may be operated to generate a voltage waveform of variable amplitude and phase angle.

Preferably each energy storage device includes a capacitor, fuel cell, battery, photovoltaic cell or an auxiliary AC generator with an associated rectifier.

Such flexibility is useful in the design of converter stations in different locations where the availability of equipment may vary due to locality and transport difficulties. For example, the energy storage device of each module on an offshore wind farm may be provided in the form of an auxiliary AC generator connected to a wind turbine.

Each switching element preferably includes at least one semiconductor device or includes a plurality of semiconductor devices connected in series. The or each semiconductor device may be an insulated gate bipolar transistor, a field effect transistor, a gate turn-off thyristor, a gate commutated thyristor, an integrated gate commutated thyristor or a transistor.

In embodiments employing the use of semiconductor devices, each semiconductor device may be connected in parallel with an anti-parallel diode.

The use of semiconductor devices is advantageous because such devices are small in size and weight and have relatively low power dissipation, which minimises the need for cooling equipment. It therefore leads to significant reductions in power converter cost, size and weight.

The fast switching capabilities of such semiconductor devices allow the or each auxiliary converter to not only synthesize complex waveforms when modifying the first and/or second DC voltages, but also to synthesize high quality waveforms to further minimise harmonic distortion and DC ripple levels. Furthermore the inclusion of such semiconductor devices allows the or each auxiliary converter to respond quickly to changes in the AC and DC voltages and modify the synthesised waveforms accordingly.

In further embodiments, the or each auxiliary converter is operable in use to synthesize a waveform including at least one rectified, zero-phase sequence triplen harmonic component to produce a compensatory DC voltage to compensate for changes in the real and/or reactive power requirements on the AC side of the respective phase element.

In use, synthesis of the waveform may produce a negative compensatory DC voltage component to compensate for an increase in the first DC voltage required to generate reactive power from the AC network or a positive compensatory DC voltage component to compensate for a decrease in the first DC voltage required to absorb reactive power from the AC network.

By controlling each auxiliary converter, it is possible to produce a compensatory DC voltage component so as to ensure that the net increase or decrease in the first DC voltage is controlled to be zero whilst the AC voltage can be made to vary in order to allow reactive power control.

According to a second aspect of the invention, there is provided a method of controlling a voltage source converter including a plurality of phase elements connected between first and second DC terminals connected to a DC network, the or each phase element including a plurality of primary switching elements and at least one AC terminal connected to a respective phase of a multi-phase AC network comprising the steps of controlling the primary switching elements to facilitate power conversion between the AC and DC networks and modifying a DC voltage presented to the DC network to minimise ripple in the DC voltage.

Other advantageous features of the invention are recited in dependent Claims 25 to 30.

Preferred embodiments of the invention will now be described, by way of non-limiting examples, with reference to the accompanying drawings in which.

Figure 1:
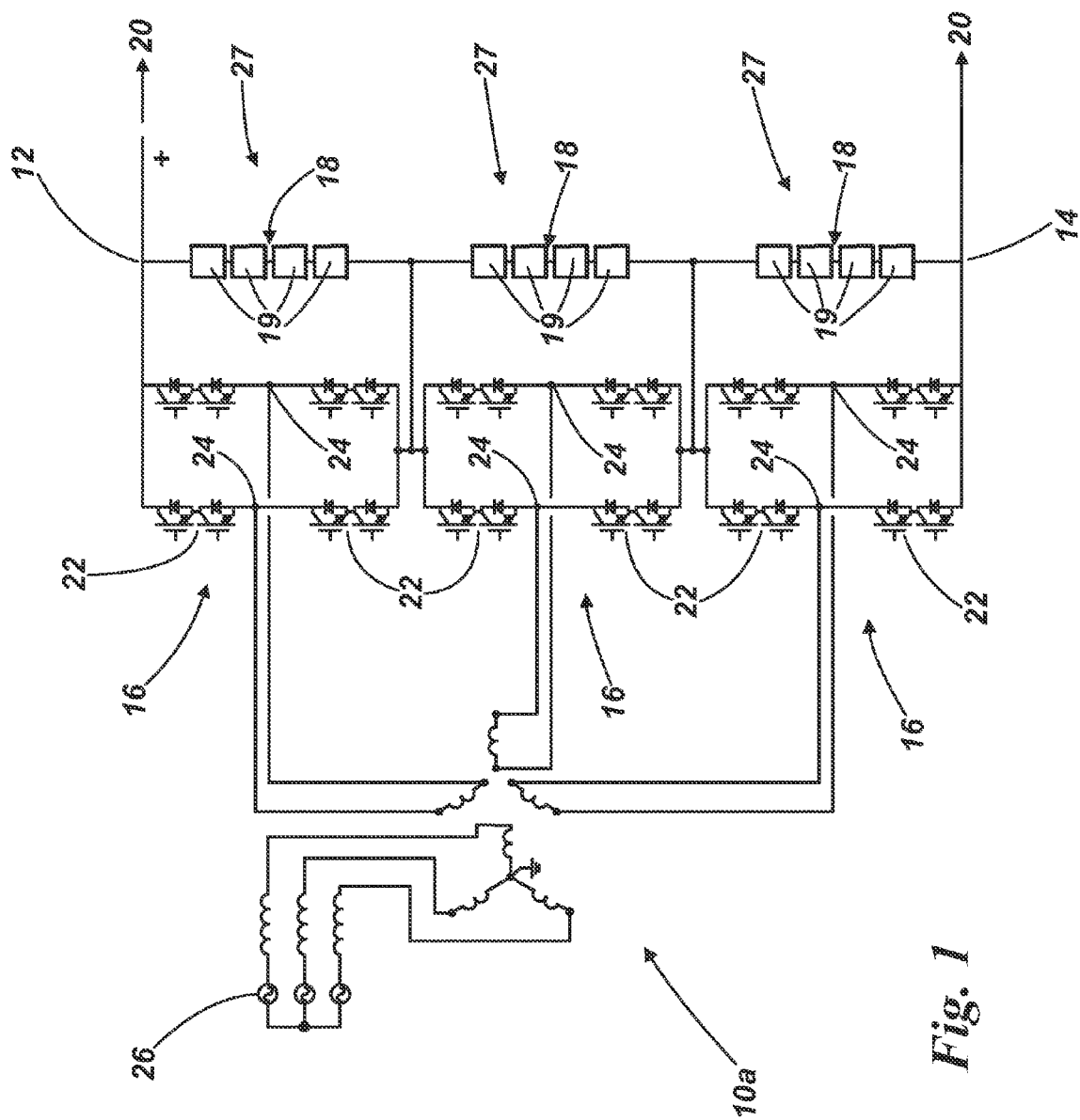
FIG. 1 shows, in schematic form, a voltage source converter according to a first embodiment of the invention.
Figure 3:
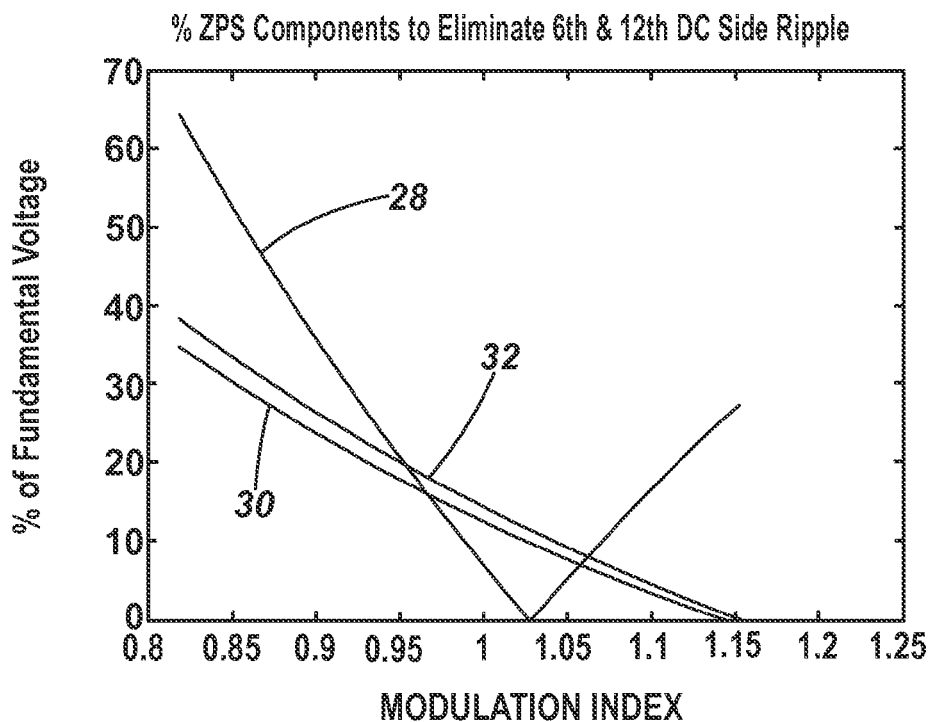
Figure 4:
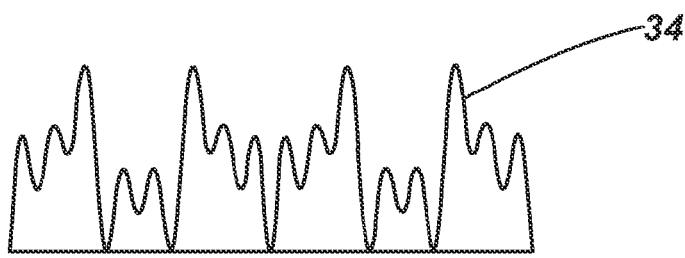
Figure 4:
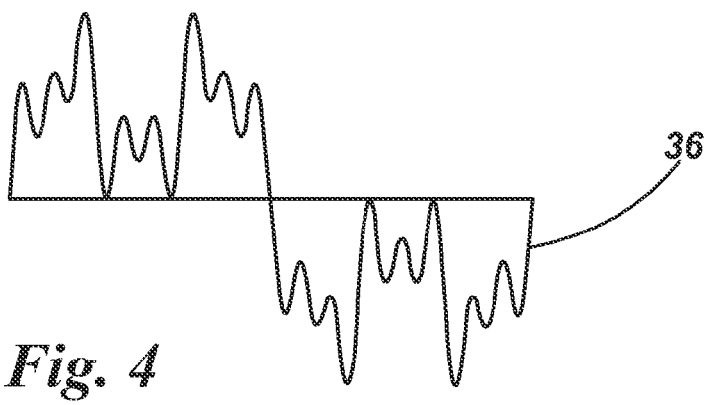
Figure 5:
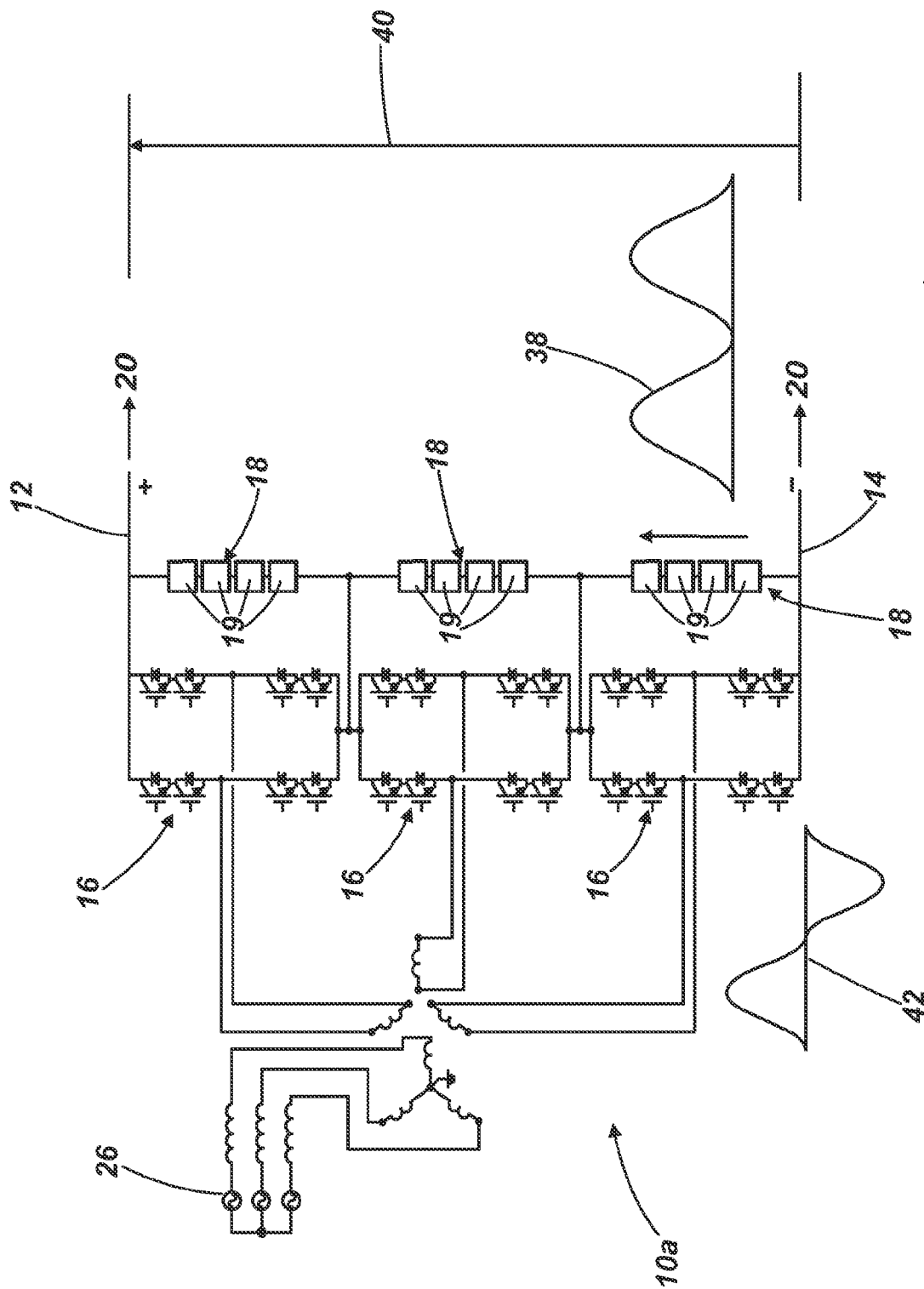
Figure 6:
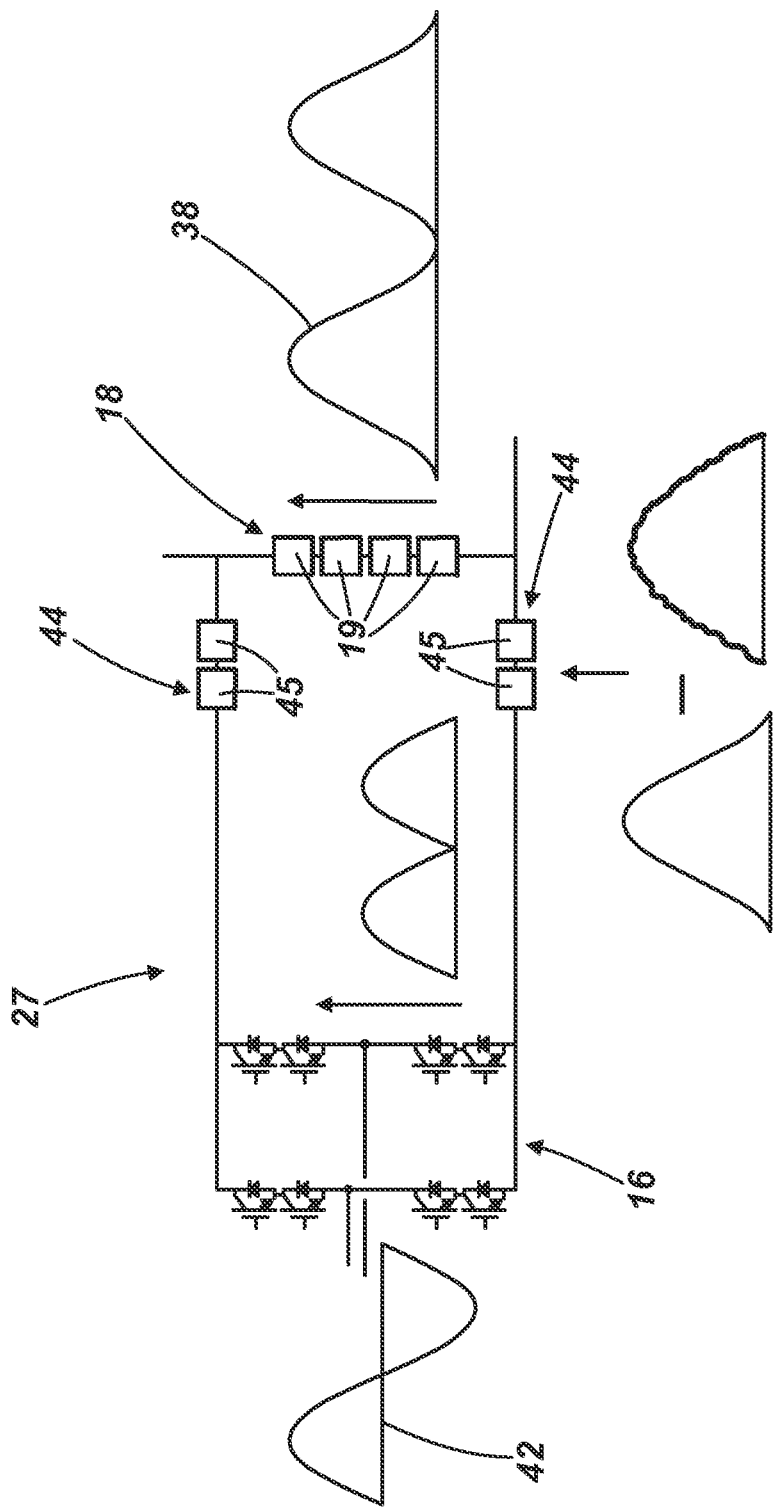
Figure 7:
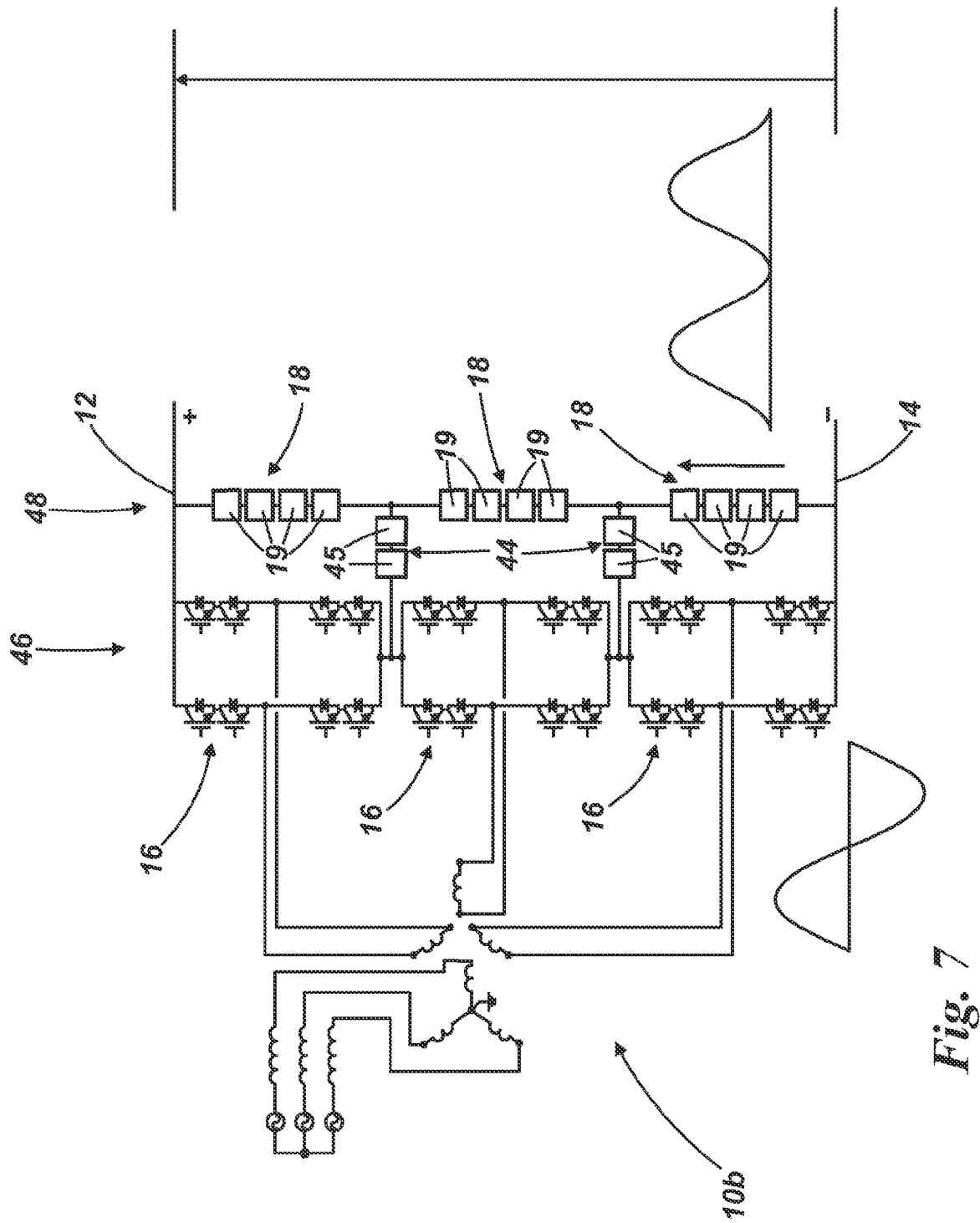

FIG. 3 shows the ratio of the first DC voltage to fundamental component of AC side voltage required to facilitate reactive power control for a voltage source converter and the required amount of $3^{rd}$ harmonic modulation in the presence of a constant average first DC voltage, and the relative levels of $9^{th}$ and $15^{th}$ harmonic modulation required to totally eliminate the $6^{th}$ and $12^{th}$ harmonic ripple components from the first DC voltage;

FIG. 4 shows a synthesized waveform and the corresponding AC side waveform for an operating condition near to 0.8 modulation index in which large amounts of $3^{th}$, $9^{th}$ and $15^{th}$ harmonic modulation are required;

FIG. 5 shows, in schematic form, the operation of the voltage source converter in FIG. 1 to minimise DC ripple;

FIG. 6 shows, in schematic form, a single-phase converter limb including tertiary converters; and FIG. 7 shows, in schematic form, a voltage source converter according to a second embodiment of the invention.

A voltage source converter 10a according to a first embodiment of the invention is shown in FIG. 1.

The voltage source converter 10a comprises first and second DC terminals 12,14, three phase elements 16 and three auxiliary converters 18.

In use, the first and second DC terminals 12,14 are respectively connected to positive and negative terminals of a DC network 20, the positive and negative terminals respectively carrying a voltage of $+V_{DC}/2$ and $-V_{DC}/2$, where $V_{AC}$ is the voltage range of the DC network 20.

Each of the three phase elements 16 includes two parallel-connected pairs of series-connected primary switching elements 22. Each primary switching element 22 is in the form of one or more series-connected insulated gate bipolar transistors, each insulated gate bipolar transistor being connected in parallel with an anti-parallel diode. The mid-points between each string of series-connected primary switching elements 22 define AC terminals 24 for connection in use to a respective phase of a three-phase AC network 26.

In use, the primary switching elements 22 are controllable to facilitate power conversion between the AC and DC networks 26,20. For example, the primary switching elements 22 may be controlled to switch on and off once every cycle of the frequency of the AC network 26 to enable conversion of a DC voltage presented to the DC side of the respective phase element 16 to an AC voltage.

Each auxiliary converter 18 is in the form of a chain-link converter including a chain of modules 19 connected in series, and is connected in parallel with a respective one of the phase elements 16 to define a single-phase converter limb 27. The three single-phase converter limbs 27 are connected in series on the DC side of the circuit between the first and second DC terminals 12,14 to define a two-terminal DC network for three-phase power transmission The phase elements 16 and auxiliary converters 18 of each single-phase converter limb 27 operate independently of the other single-phase converter limbs 27, and therefore only directly affect the phase connected to the AC terminals 24 of the respective phase element 16, and have limited influence on the phases connected to the AC terminals 24 of the other phase elements 16.

In use, operation of the voltage source converter 10a results in the presentation of a first DC voltage to the DC network 20 in which the first DC voltage is equal to the sum of the individual DC voltages across the phase elements 16.

In embodiments of the invention, each module 19 of each chain-link converter 18 may include a pair of secondary switching elements connected in parallel with a capacitor in a half-bridge arrangement to define a 2-quadrant unipolar module that can provide zero or positive voltage and can conduct current in two directions In other embodiments, each module 19 of each chain-link converter 18 may include two pairs of secondary switching elements connected in parallel with a capacitor in a full-bridge arrangement to define a 4-quadrant bipolar module that can provide negative, zero or positive voltage and can conduct current in two directions.

The secondary switching elements of each module 19 are operable so that the chain of modules 19 provides a stepped variable voltage source.

Each secondary switching element includes an insulated gate bipolar transistor connected in parallel with an anti-parallel diode.

The fast switching capabilities of insulated gate bipolar transistors allow the or each auxiliary converter 18 to not only synthesize complex waveforms to modify the first DC voltage, but also to synthesize high quality waveforms to further minimise harmonic distortion and DC ripple levels. Furthermore the inclusion of such semiconductor devices allows the auxiliary converters 18 to respond quickly to changes in the AC and DC voltages and alter the characteristics of the synthesised waveforms accordingly.

It is envisaged that in other embodiments of the invention each of the primary and secondary switching elements may include a different semiconductor device such as a field effect transistor, a gate turn-off thyristor, a gate commutated thyristor, an integrated gate commutated thyristor, a transistor or other forced commutated or self commutated semiconductor switches, accompanied by a reverse-parallel connected diode.

It is also envisaged that in other embodiments each of the primary and secondary switching elements may include a single semiconductor device or a string of semiconductor devices connected in series. The series arrangement allows the use of semiconductor devices with low power ratings provides a combined power rating that is compatible with the high voltage nature of power transmission.

In further embodiments, it is envisaged that the capacitor of each of the modules 19 may be replaced by a different energy storage device such as a fuel cell, a battery, photovoltaic cell or an auxiliary AC generator with an associated rectifier.

The capacitor of each module 19 may be bypassed or inserted into the chain-link converter 18 by changing the state of the secondary switching elements.

A capacitor of a module 19 is bypassed when a pair of secondary switching elements is configured to form a short circuit in the module 19, causing the current in the voltage source converter 10a to pass through the short circuit and bypass the capacitor.

A capacitor of a module 19 is inserted into the chain-link converter 18 when a pair of secondary switching elements is configured to allow the converter current to flow into and out of the capacitor, which is then able to charge or to discharge its stored energy and provide a voltage. In embodiments employing the use of 4-quadrant bipolar modules, the secondary switching elements may be configured to insert the capacitor in forward or reverse directions so as to provide a positive or negative voltage.

It is therefore possible to build up a combined voltage across the chain-link converter 18, which is higher than the voltage available from each of the individual modules 19 via the insertion of the capacitors of multiple modules 19, each providing its own voltage, into the chain-link converter 18.

The ability of a 4-quadrant bipolar module to provide positive or negative voltages means that the voltage across each chain-link converter 18 may be built up from a combination of modules 19 providing positive or negative voltages. The energy levels in the individual capacitors may be maintained therefore at optimal levels by controlling the modules 19 to alternate between providing positive or negative voltage.

Figure 2:
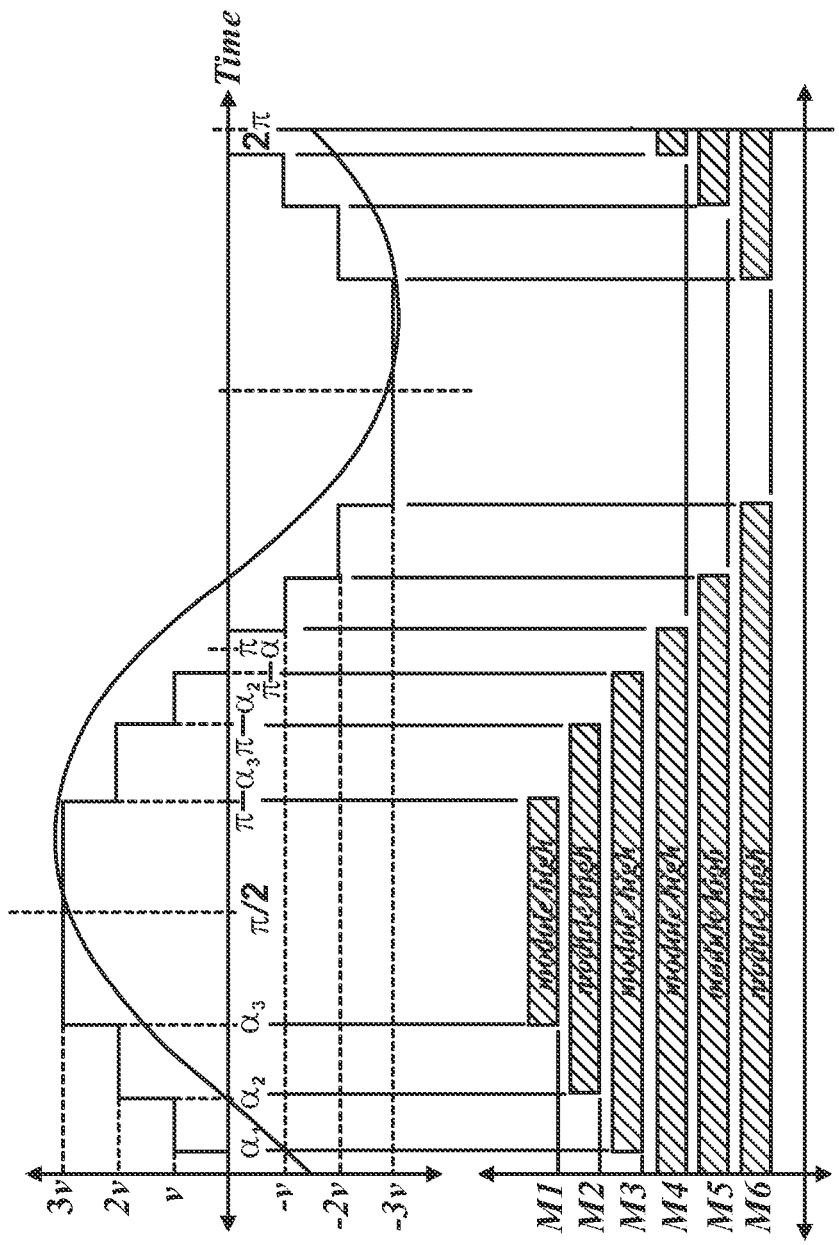
FIG. 2 shows the synthesis of a 50 Hz sinusoidal waveform using a chain-link converter.

It is also possible to vary the timing of switching operations for each module 19 such that the insertion and/or bypass of the capacitors of individual modules 19 in the chain-link converter 18 results in the generation of a voltage waveform. An example of a voltage waveform generated using the chain-link converter 18 is shown in FIG. 2, in which the insertion of the capacitors of the individual modules 19 is staggered to generate a 50 Hz sinusoidal waveform. Other waveform shapes may be generated by adjusting the timing of switching operations for each module 19 in the chain-link converter 18.

It is envisaged that in other embodiments, each chain-link converter 18 may be replaced by other power converter arrangements with similar waveform synthesis capabilities.

In use, each auxiliary converter 18 may be used to modify a second DC voltage presented to the DC side of the respective phase element 16 by synthesizing a near-approximation of a rectified sinusoidal waveform for presentation to the DC side of the phase element 16. This results in the production of a near-perfect sine-wave, with minimal harmonic distortion, on the AC side of the phase element 16. The voltage source converter 10a does not therefore require harmonic filters on the AC side of the converter 10a to control power quality.

This also allows the primary switching elements 22 to be switched at near zero voltage and therefore results in almost zero switching losses during normal operation of the converter.

The use of auxiliary converters 18 means that the voltage profile presented to the primary switching elements 22 of each phase element 16 is imposed and controlled by the respective auxiliary converter 18, and is a slowly changing waveform rather than the high voltage steps that would otherwise be presented to the insulated-gate bipolar transistors. It therefore removes the need for complex active gate drives and large voltage sharing components within the main converter design, and instead results in simpler, less expensive and more efficient hardware.

In addition, the use of the auxiliary converters 18 enables the voltage imposed on the primary switching elements 22 of each phase element 16 to be rapidly ramped to zero (or minimum value) when required, during fault conditions, to facilitate soft switching at reduced voltage.

In order to compensate for changes in the real power and/or reactive power requirements on the AC side of the phase element 16, the auxiliary converter 18 is preferably operable to synthesize a waveform including a triplen harmonic voltage to modify the first DC voltage. This results in the production of a compensatory DC voltage component to compensate for the resultant change in the DC voltage on the DC side of the phase element 16.

For example, in circumstances where it becomes necessary to generate reactive power on the AC side of the phase element 16, the auxiliary converter 18 is operable to synthesize a waveform including a rectified, zero-phase sequence triplen harmonic component. This results in the production of a negative compensatory DC voltage component to compensate for the resultant increase in the first DC voltage.

In circumstances where it becomes necessary to absorb reactive power from the AC side of the phase, the auxiliary converter 18 is operable to synthesize a waveform including a rectified, zero-phase sequence triplen harmonic component. This results in the production of a positive compensatory DC voltage component to compensate for the resultant decrease in the first DC voltage.

By controlling each auxiliary converter 18, it is possible to produce a compensatory DC voltage component so as to ensure that the net increase or decrease in the first DC voltage is controlled to be zero whilst the AC voltage can be made to vary in order to allow reactive power control.

Operation of each auxiliary converter 18 to synthesize waveforms including rectified triplen harmonic components may also be used to increase the AC voltage on the AC side of the phase element 16 in circumstances where the reactive power requirement is small or not needed.

This reduces the current drawn by the converter 10a for a given power conversion in both rectified and inverter operating modes. This is beneficial because lower levels of current flow reduce power losses that would otherwise occur in converter equipment. It may also reduce the ripple current components in any capacitors (not shown) connected to the DC side of the phase element 16, thereby reducing capacitance requirements and associated power losses.

Zero-phase sequence, $3^{rd}$ harmonic components are not seen in the primary line to line voltage waveforms or in the primary or secondary side current waveforms. Other triplen waveforms (e.g. $9^{th}$, $15^{th}$ $21^{st}$, etc.) may also be applied with similar effects.

The zero-phase sequence nature of the rectified triplen harmonic components means that when a transformer is used to interconnect the voltage source converter 10a and the AC network 26, the effects of the additional modulation is limited to the secondary side of the transformer connected to the voltage source converter 10a and has no effect on the AC line voltage and current at the primary side of the transformer connected to the AC network 26.

However, the addition of rectified triplen harmonic components to the synthesized waveforms results in DC ripple in the first DC voltage. For example, addition of $3^{rd}$ harmonic components results in DC ripple components appearing in the first DC voltage, which are in the form of $6^{th}$, $12^{th}$, $18^{th}$ etc harmonics of the AC supply frequency To minimise the DC ripple arising from the addition of rectified triplen harmonic components, each auxiliary converter 18 is operable to synthesize a waveform including at least one rectified, zero-phase sequence triplen harmonic component.

The inclusion of one or more rectified zero-phase sequence triplen harmonic components in each synthesized waveform results in the elimination of one or more of the harmonic ripple components in the first DC voltage. For example, when the DC ripple in the first DC voltage includes $6^{th}$ and $12^{th}$ harmonic ripple components, the inclusion of $9^{th}$ and $15^{th}$ zero-phase sequence harmonic components in each of the synthesized waveforms will result in the cancellation of the $6^{th}$ and $12^{th}$ harmonic ripple components and thereby minimise DC ripple in the first DC voltage.

FIG. 3 shows the ratio of the first DC voltage to fundamental component of AC side voltage required to facilitate reactive power control for a voltage source converter and the required amount of $3^{rd}$ harmonic modulation 28 in the presence of a constant average DC side voltage. Also shown are the corresponding relative levels of $9^{th}$ and $15^{th}$ harmonic modulation 30,32 required to totally eliminate the $6^{th}$ and $12^{th}$ harmonic ripple components from the summed voltage appearing at the DC network as a result of the $3^{rd}$ harmonic modulation. An example of a synthesized waveform is shown in FIG. 4, in which, for an operating condition near to 0.8 modulation index, the synthesized waveform 34 and the corresponding AC side waveform 36 includes $3^{th}$, $9^{th}$ and $15^{th}$ harmonic components.

As outlined above, the introduction of zero-phase sequence triplen harmonic components into the synthesized waveforms has minimal effect on the AC network.

Another approach to minimise DC ripple in the first DC voltage is shown in FIG. 5.

In this approach, each auxiliary converter 18 may be controlled in use to synthesize a waveform 38 including a DC voltage component and a second harmonic AC voltage component, each synthesized waveform 38 operating at phase difference of 120 electrical degrees to the other two synthesized waveforms 38. The summation of these three synthesized waveforms 38 leads to the second harmonic AC voltage components cancelling out each other and thereby results in a ripple-free DC side voltage 40 consisting of the DC voltage components at the DC network 20. In other embodiments, each synthesized waveform 38 may include more than one harmonic AC voltage component.

Such waveforms are more straightforward to synthesize, which simplifies control of each auxiliary converter 18 when synthesizing the waveform.

Each of the synthesised waveforms 38 is also presented to the DC side of the respective phase element 16. The presence of non zero-phase sequence harmonic AC voltage components in the synthesized waveforms results in an AC side waveform 42 with low levels of harmonic distortion at the AC network 26.

To eliminate the harmonic distortion caused by the presence of non zero-phase sequence harmonic AC voltage components, the voltage source converter may further include the use of tertiary converters.

Each single-phase converter limb 27 of the voltage source converter 10a shown in FIG. 1 may be modified to include one or two tertiary converters 44, each tertiary converter being connected on either side of the phase element 16 to define a series connection, as shown in FIG. 6. Each tertiary converter 44 of each single-phase converter limb 27 operates independently of that of the other single-phase converter limbs 27 and therefore only directly affects the phase connected to the AC terminals 24 of the respective phase element 16, and has limited influence on the phases connected to the AC terminals 24 of the other phase elements 16.

Each tertiary converter 44 is in the form of a chain-link converter including a chain of modules 45 connected in series, which is operable in a similar manner to the chain-link converter 18 described above with reference to FIG. 1. As outlined above, the structure of the chain-link converter allows the synthesis of a near-approximation of a rectified sinusoidal waveform for presentation to the DC side of the respective phase element 16, and thereby allows the second DC voltage to have a different form to that of the waveform synthesized by the auxiliary converter 18.

The use of the tertiary converters 44 in this manner leads to the generation of an AC sinusoidal waveform 42, with minimal harmonic distortion, on the AC side of the phase element 16 and thereby minimises the aforementioned effects of non zero-phase sequence harmonic AC voltage components on the AC network when each auxiliary converter 18 is controlled in use to synthesize a waveform 38 including a DC voltage component and at least one harmonic AC voltage component to minimise DC ripple in the first DC voltage.

A voltage source converter 10b according to a second embodiment of the invention is shown in FIG. 7.

The voltage source converter 10b in FIG. 7 is similar to the voltage source converter 10a in FIG. 1 except that the phase elements 16 are connected in a cascade arrangement to define a first limb 46, three auxiliary converters 18 are connected in a cascade arrangement to define a second limb 48, the first and second limbs 46,48 being connected in parallel on the DC side of the circuit between the first and second DC terminals 12,14, and each tertiary converter 44 is connected between a respective one of the junctions between the phase elements 16 and a respective one of the junctions between the auxiliary converters 18.

This converter arrangement is advantageous in that each tertiary converter 44 is operable in use to modify a plurality of second DC voltages, each second DC voltage being presented to the DC side of the respective phase element 16 instead of assigning a tertiary converter 44 to a respective phase element 16. The reduced number of tertiary converters 44 results in a reduction in hardware size, weight and costs.

The inclusion of auxiliary and/or tertiary converters in the converter arrangement therefore provides the voltage source converter with DC side active filtering capability for minimising DC ripple, and thereby eliminates the need for DC side filtering equipment in the form of passive inductive and capacitive elements. This leads to reductions in converter hardware costs, size and weight whilst increasing the reliability and efficiency of the associated power station.

The invention claimed is:

1. A voltage source converter for use in high voltage direct current power transmission and reactive power compensation, the voltage source converter comprising: first and second DC terminals for connection in use to a DC network, three phase elements and three auxiliary converters connected between the first and second DC terminals, each phase element including two parallel connected strings of series connected primary switching elements, the each mid-points between each string of series-connected primary switching elements defining an AC terminals for connection in use to a respective phase of an AC network, each auxiliary converter being connected in parallel with a respective one of the phase elements to define a single-phase converter limb and the three single-phase converter limbs being mounted and connected in series to the first and second DC terminals to define a two-terminal DC network for three-phase power transmission; the primary switching elements being controllable in use to facilitate power conversion between the AC and DC networks, each auxiliary converter being operable in use to act as a waveform synthesizer to modify a first DC voltage presented to the DC network so as to minimise ripple in the DC voltage.

2. A voltage source converter according to claim 1 wherein each auxiliary converter is operable in use to act as a waveform synthesizer to modify a second DC voltage presented to the DC side of the respective phase element.

3. A voltage source converter according to claim 2 wherein each auxiliary converter is operable in use to synthesize a near-approximation of a rectified sinusoidal waveform for presentation to the DC side of the respective phase element.

4. A voltage source converter according to claim 1 wherein each auxiliary converter is operable in use to synthesize a waveform including at least one rectified, zero-phase sequence triplen harmonic component to cancel one or more harmonic ripple components in the first DC voltage.

5. A voltage source converter according to claim 1 wherein each auxiliary converter is operable in use to synthesize a waveform including a DC voltage component and at least one harmonic AC voltage component, each waveform operating at a phase difference of 120 electrical degrees to the other two waveforms.

6. A voltage source converter according to claim 5 further including at least one tertiary converter, the or each tertiary converter being operable in use to act as a waveform synthesizer to modify one or more second DC voltages, each second DC voltage being presented to the DC side of the respective phase element.

7. A voltage source converter according to claim 6 wherein the or each tertiary converter is operable in use to synthesize a near-approximation of an offset rectified sinusoidal waveform for presentation to the DC side of the respective phase element.

8. A voltage source converter according to claim 6 wherein the or each tertiary converter includes a chain-link converter.

9. A voltage source converter according to claim 8 wherein the chain-link converter includes a chain of modules connected in series, each module including at least one pair of secondary switching elements connected in parallel with an energy storage device, the secondary switching elements being controllable in use so that the chain of modules connected in series presents a stepped variable voltage source.

10. A voltage source converter according to claim 9 wherein the or each module includes a pair of secondary switching elements connected in parallel with the energy storage device in a half-bridge arrangement to define a 2-quadrant unipolar module that can provide zero or positive voltage and can conduct current in two directions.

11. A voltage source converter according to claim 9 wherein the or each module includes two pairs of secondary switching elements connected in parallel with the energy storage device in a full-bridge arrangement to define a 4-quadrant bipolar module that can provide negative, zero or positive voltage and can conduct current in two directions.

12. A voltage source converter according to claim 9 wherein each energy storage device includes a capacitor, fuel cell, battery, photovoltaic cell or an auxiliary AC generator with an associated rectifier.

13. A voltage source converter according to claim 1 wherein each single-phase converter limb includes at least one tertiary converter.

14. A voltage source converter according to claim 13 wherein at least one tertiary converter is connected in series with the respective phase element.

15. A voltage source converter according to claim 1 wherein the phase elements are connected in a cascade arrangement to define a first limb, the three auxiliary converters are connected in a cascade arrangement to define a second limb, the first and second limbs being connected in parallel on the DC side of the circuit between the first and second DC terminals, and a tertiary converter is connected between a respective one of the junctions between the phase elements and a respective one of the junctions between the auxiliary converters.

16. A voltage source converter according to claim 1 wherein each auxiliary converter includes a chain-link converter.

17. A voltage source converter according to claim 1 wherein each switching element includes at least one semiconductor device.

18. A voltage source converter according to claim 9 wherein each switching element includes a plurality of semiconductor devices connected in series.

19. A voltage source converter according to claim 9 wherein the or each semiconductor device is an insulated gate bipolar transistor, a field effect transistor, a gate turn-off thyristor, a gate commutated thyristor, an integrated gate commutated thyristor or a transistor.

20. A voltage source converter according to claim 9 wherein the or each semiconductor device is connected in parallel with an anti-parallel diode.

21. A voltage source converter according to claim 1 wherein the or each auxiliary converter is operable in use to synthesize a waveform including at least one rectified, zero-phase sequence triplen harmonic component to produce a compensatory DC voltage component to compensate for changes in the real and/or reactive power requirements on the AC side of the respective phase element.

22. A voltage source converter according to claim 21 wherein in use, synthesis of the waveform produces a negative compensatory DC voltage component to compensate for an increase in the first DC voltage required to generate reactive power from the AC network.

23. A voltage source converter according to claim 21 wherein in use, synthesis of the waveform produces a positive compensatory DC voltage component to compensate for a decrease in the first DC voltage required to absorb reactive power from the AC network.

24. A method of controlling a voltage source converter including three phase elements and three auxiliary converters connected between first and second DC terminals connected to a DC network, each phase element including two parallel connected strings of series connected primary switching elements, each mid-point between each string of series-connected primary switching elements defining an AC terminal connected to a respective phase of an AC network, each auxiliary converter being connected in parallel with a respective one of the phase elements to define a single-phase converter limb, and the three single-phase converter limbs being mounted in series and connected to the first and second terminals to define a two-terminal DC network for three-phase power transmission; comprising the steps of: (a) controlling the primary switching elements to facilitate power conversion between the AC and DC networks; (b) modifying a first DC voltage presented to the DC network so as to minimise ripple in the first DC voltage.

25. A method according to claim 24 wherein the first DC voltage is modified by injecting one or more waveforms including at least one rectified, zero-phase sequence triplen harmonic component to cancel one or more harmonic ripple components in the first DC voltage.

26. A method according to claim 24 wherein the first DC voltage is modified by injecting three waveforms including a DC voltage component and at least one harmonic AC voltage component, each waveform operating at a phase difference of 120 electrical degrees to the other two waveforms.

27. A method according to claim 26 further including the step of modifying a second DC voltage presented to the DC side of the respective phase element to form a near-approximation of an offset rectified sinusoidal waveform.

28. A method according to claim 24 wherein the first DC voltage is modified by injecting one or more waveforms including at least one rectified, zero-phase sequence triplen harmonic component to produce a compensatory DC voltage component to compensate for changes in the real and/or reactive power requirements on the AC side of the respective phase element.

29. A method according to claim 28 wherein the or each waveform is injected to produce a negative compensatory DC voltage component, to compensate for an increase in the DC voltage required to generate reactive power from the AC network.

30. A method according to claim 28 wherein the or each waveform is injected to produce a positive compensatory DC voltage component to compensate for a decrease in the DC voltage required to absorb reactive power from the AC network.

* * * * *